United States Patent [19]

Thompson

[11] 4,109,018

[45] Aug. 22, 1978

[54] LOW CALORIE DIET BREAD

[76] Inventor: Jerome B. Thompson, Rte. 3, Box 231, Cumberland, Md. 21502

[21] Appl. No.: 773,499

[22] Filed: Mar. 2, 1977

Related U.S. Application Data

[63] Continuation-in-part of Ser. No. 690,501, May 27, 1976, abandoned.

[51] Int. Cl.$^2$ .......................... A21D 2/36; A21D 2/34
[52] U.S. Cl. ...................................... 426/62; 426/549; 426/19; 426/21; 426/804
[58] Field of Search ...................... 426/19, 21, 804, 62, 426/549

[56] References Cited

U.S. PATENT DOCUMENTS

| | | | |
|---|---|---|---|
| 3,023,104 | 2/1962 | Battista | 426/804 |
| 3,573,061 | 3/1971 | Glabe et al. | 426/19 X |
| 3,574,634 | 4/1971 | Singer | 426/19 X |
| 3,676,150 | 7/1972 | Glicksman et al. | 426/19 X |
| 3,767,423 | 10/1973 | Tsantir et al. | 426/804 |
| 3,979,523 | 9/1976 | Titcomb et al. | 426/19 |

OTHER PUBLICATIONS

Pyler, Baking Science and Technology, vol. 1, 1952, Subel Publ. Co., Chicago, Ill., pp. 247-249, 327.

*Primary Examiner*—Joseph M. Golian
*Attorney, Agent, or Firm*—Schuyler, Birch, Swindler, McKie & Beckett

[57] ABSTRACT

A bread product which has superior nutritional characteristics regarding protein and roughage content and which exhibits a significant caloric reduction over standard white bread.

12 Claims, No Drawings

LOW CALORIE DIET BREAD

RELATED APPLICATION

This is a continuation-in-part of application Ser. No. 690,501, filed May 27, 1976 and now abandoned.

BACKGROUND OF THE INVENTION

1. Field of the Invention

This invention relates to bread products having enhanced nutritional values and reduced caloric content.

2. Description of the Prior Art

For many years there have been available to American consumers a number of products called diet breads. In general, they are light colored, bland flavored loaves similar to white bread in taste and in composition. Dark colored loaves usually have been obtained by the inclusion of caramel color and not by using roughage-rich whole grain flours. The nutritional contribution of these commercial diet breads has been the inclusion of vegetable flours such as soy flour, dried edible yeasts, casein, gum gluten and dry skim milk into a white bread formula. Any caloric reduction per unit weight generally results only from a reduction or elimination of fat from such a formula.

Recently, there has arisen the realization that roughage from plant sources, measured as crude fiber, is not just a non-assimilable component but is a dietary component possessing great nutritional significance. See Spiller, "Role of Dietary Fiber in Nutrition," Food Product Development, September, 1974. Studies comparing the typical purified Western diet with certain African groups and their effects provide unequivocal statistics indicating that habitually increased intakes of such roughage or crude fiber causes reduction in the incidence of tumors of the colon and rectum, appendicitis, haital hernia, hemorrhoids, constipation and related gastrointestinal problems. There is also some evidence that people on a fiber rich diet are spared some circulatory diseases including atherosclerosis.

Upon analysis, commercial diet breads show a protein content close to whole wheat bread. It has been recognized that the component of the population consuming proportinately the greatest amount of bread — the young and the poor — are most apt to receive insufficient protein in both quantity and quality.

USDA Handbook No. 8, "Composition of Foods," 1963, provides the following maximum analyses of standard white and whole wheat breads:

|  | Water | Carbohydrate | Protein | Fat | Crude Fiber | Calorie/ 100 gm |
|---|---|---|---|---|---|---|
| White Bread | 35 | 50.2 | 9.0 | 3.8 | .2 | 275 |
| Whole Wheat Bread | 36.4 | 47.7 | 10.5 | 3.0 | 1.6 | 243 |

Analysis has revealed that diet loaves on the market are similar to whole wheat bread in protein content, and approximate white bread in crude fiber content. A typical "diet" loaf has a caloric value of about 257 calories/100 grams; this is only slightly lower than white bread. The low fat content of these diet breads is primarily responsible for these minor differences.

Various low calorie bread products have been proposed in the patent literature. Singer, U.S. Pat. No. 3,574,634 describes a product in which low caloric content is achieved in part by the elimination or reduction of starch. Glicksman, U.S. Pat. No. 3,676,150, discloses a low calorie baked product based on a gluten-free formula. Tsantir, U.S. Pat. No. 3,767,423, describes a low calorie bread product containing a mixture of rice hulls and soy bean hulls. None of these proposed low calorie breads, however, has succeeded in providing a commercially feasible and consumer-acceptable product.

In view of the shortcomings of the so-called diet breads now on the market, it would be highly desirable to provide a bread product which is truly a "diet bread" in that it possesses a significant reduction in caloric content while maintaining the appearance and texture of standard bread types including white and dark loaves.

SUMMARY OF THE INVENTION

It is, therefore, an object of the present invention to provide a low calorie bread product which resembles standard bread formulations in appearance and texture.

It is a further object of this invention to provide a diet bread product which exhibits a caloric reduction of about 25 to 40% over standard white bread.

It is also an object of this invention to provide a diet bread product having an increased protein content.

It is a further object of this invention to provide a diet bread product containing about three times as much crude fiber as is normally present in whole wheat bread without introducing any significant harshness to the product.

It is also an object of the present invention to provide a diet bread formulation which is compatible with standard bread ingredients, such as yeast, salt, fermentable sugars, vitamins, mold inhibitors, yeast food, and the like.

An additional object of the present invention is to provide a diet bread formulation which can be processed into a baked product using conventional commercial baking equipment.

Briefly described, the present invention comprises wheat flour, water, salt, yeast, fermentable sugar, and from about 3 to about 9 parts by weight of an added vital wheat gluten, from about 5 to about 12 parts by weight of a protein material selected from the group consisting of lowfat soy flour, nonfat dry milk, dried yeast flour, cottonseed flour, and mixtures thereof, from about 10 to about 20 parts by weight of an alpha cellulose flour, and from about 0.5 to about 6 parts by weight of a hydrophilic gum selected from the group consisting of synthetic cellulose ethers, gum guar and gum tragacanth and mixtures thereof, all of the ingredients being expressed as parts by weight per 100 parts of wheat flour.

The present invention is also directed to a low calorie bread product formed by processing and baking the above-described dough composition.

DESCRIPTION OF THE INVENTION

Applicant has found that an unexpected caloric reduction of about 25% to 40% over standard white bread can be achieved when a bread product is formulated to contain four essential ingredients in rather narrow ranges. The four essential ingredients are vital wheat gluten, a protein source, purified alpha cellulose flour, and a hydrophilic gum. Departures from the required ranges not only have marginal effects upon caloric values, but have serious deleterious effects on the edibility and acceptability of the bread.

Analysis indicates that the cellulose and gums account for at most about 12% of the caloric reduction accomplished. The rest results from the extra water retained successfully in the bread by the combination of ingredients.

In order to make a commercial bread product, the dough mass must be standard in character and consistency to be utilized in existing handling methods and make up machinery. Moreover, the baked bread product must simulate some type of currently recognized bread variety in appearance and flavor, or it will not be accepted by the consumer. The formulation of the present invention results in a dough and bread which are sufficiently close to standard white bread that no problems in processing or acceptability exist.

It is also possible to produce a dark loaf which has the color, and harsher and stronger flavors normally present in so-called wheat breads. To this end, the dough formulation of the present invention can be modified with conventional agents which introduce the desired coarseness, color and flavor to the bread product.

In a dough, there is a continuous phase of hydrocolloid and a discontinuous particulate phase. The amount of water to make a dough of proper consistency is determined by that held by the hydrocolloid and on the surfaces of the dispersed phase. The colloidal properties are affected, of course, by both solubles and insolubles in that dough. In white bread dough, the gluten portion of wheat flour is the continuous phase and the starch of this flour is the discontinuous phase. They, together as flour, determine rather precisely the amount of water required to yield a proper dough. Dough mixing insures proper hydration of the gluten and its spread through the dough mass as a continuum.

During the proofing stages of bread making the hydrocolloid traps carbon dioxide liberated by yeast action on sugars, and the dough assumes a loaf shape and proportions. This action continues into the first quarter of the baking operation. At about 70° C. in the baking process the starch granules begin to swell and to absorb free water from the hydrocolloid. As the colloid is dehydrated, its elasticity is decreased and expansion due to the leavening gases is diminished. The reduction of free water by starch swelling accompanied by increased rigidity of the hydrocolloid through protein denaturation and the baking out of the mass, leaves it with the resilient and relatively dry structure that is recognized as bread.

While not wishing to be bound by any particular theory, applicant believes that the added gluten in the bread product of the present invention increases the overall hydrocolloid which can be spread over the extra surface provided by the alpha cellulose which is a new particulate phase. The added protein component evidently and unexpectedly contributes to the functionality of the gluten and is effective with the cellulose but not with starch. The protein ingredient obviously enters into the denaturation reactions of baking as well.

The alpha cellulose flour, as a particulate phase, is very different from starch. While the cellulose flour can carry free surface water, it has no function in the baking process since it does not swell. The hydrophilic gums apparently bind preferentially to the cellulose and make the incorporation of cellulose into the dough more like starch. The high absorptivity of these gums seems to be a minor function in caloric reduction.

The overall effect of this novel combination of ingredients is a dough with physical characteristics equivalent to white bread dough but which has a significant amount of non-caloric cellulosic material and a greatly increased water content. During baking of this high-water containing dough, some of the free water is absorbed into the starch as it swells; some water remains in the gluten and proteins and some is driven off or "baked out." The "bake out" loss is a constant and is largely independent of the dough water content. It will, of course, vary with baking time, baking temperature, loaf surface area and the like. In the bread product of the present invention the amount of water remaining in the denatured gluten and other proteins is greater because they are present in greater quantities.

The factor limiting the caloric reduction appears to be the extent to which starch can swell without gelling. The amount of free water available in white bread is obviously insufficient to cause serious rupturing or gelling of the starch. Continued addition of cellulose and its free surface water to the dough will at some point introduce more water than the starch can retain. Beyond this point, the resultant baked mass of gelled starch is of very poor quality. in practice, a water content of over about 46% in the finished bread is not acceptable even if a satisfactory dough can be made. The baked bread product produced by observing the specified ranges of essential ingredients according to the present invention will not exceed this maximum allowable water content.

As indicated above, one essential ingredient of the bread product of the present invention is a protein additive. This protein ingredient can comprise any source of plant or animal protein normally employed to enrich foodstuffs. The preferred protein source is defatted soy flour. Other suitable proteinaceous materials include non-fat dry milk, whey proteins, dried yeast flour, lactalbumin, cotton seed flour, and fish and meat proteins.

While the protein content of these materials will, of course, vary, it is generally desirable to employ a material with a protein content in the range of from about 30% to 85%. Materials with higher or lower protein content can, of course, be employed with attendant increase or decrease of protein in the final product.

The protein material may be employed in any form suitable for incorporation into the bread dough. Preferably, the protein will comprise a finely divided protein flour.

The protein material should be incorporated into the formulation of the present invention in an amount ranging from about 5 to 12 parts by weight per 100 parts of wheat flour. Additions of protein in the range of from about 6 to 12 parts are preferred.

The second essential ingredient of the bread formulation according to the present invention is vital wheat gluten. This ingredient may be employed in any form suitable for admixture with the other dough forming ingredients. The vital wheat gluten should be added in an amount of from about 3 to 9 parts by weight per 100 parts of wheat flour. Best results are achieved when the gluten addition is in the range of from about 6 to 8 parts.

The bread formulation of the present invention should also contain an alpha cellulose flour. Any finely divided alpha cellulose material may be employed. It is preferred that the cellulose be substantially pure. Suitable cellulose materials will generally have a particle size of from about 25 to 50 microns.

In the practice of the present invention, the cellulose ingredient should be added in the range of from about 10 to 20 parts by weight per 100 parts of wheat flour. Preferred are cellulose additions in the range of from about 18 to 20 parts.

When employing a coarsening agent such as bran to provide a specialty loaf, the amount of alpha cellulose added can be reduced slightly due to the crude fiber content of the coarsening agent. In practice, for example, a 2% reduction of cellulose replaced with about 6% bran results in a dark colored loaf which is similar in appearance to whole wheat bread and which has about the same total fiber content as the white loaf formulation of the present invention.

Alpha cellulose flour stirred with three parts of water forms a wet but particulate mass; with four parts of water, it is batter like. The water component is outside the cellulose particles and the feel between the fingers is that of a rather harsh substance suspended in water. It was found that this harshness could be eliminated or substantially ameliorated by the addition of a water dispersible hydrophilic gum. Upon such an addition, the material in batter form became dough like and coherent in character and actually felt greasy to the touch.

The preferred gums useful in the practice of the present invention are synthetic cellulose ether gums such as the carboxymethylcellulose salts and the methylcelluloses. Also suitable are certain natural gums such as Guar and Tragacanth. Other natural gums, however, such as Karaya, Algin, and Carrageenan either do not function in this system or have deleterious effects on the product. One skilled in the art can readily determine the functionality of the gum component of the formulation of the present invention.

The synthetic gums are preferred because their properties are closely controlled and their prices are relatively stable. Natural gums, on the other hand, vary widely in properties and quality and their prices fluctuate markedly with source and season. Most preferred is a mixture of gums since the properties are not identical and the benefits obtained are to a small extent additive.

The hydrophilic gum ingredient should be employed in a range of about 0.5 to 6 parts by weight per 100 parts of wheat flour. Best results when using carboxymethylcellulose are achieved in the range of about 1 to 4 parts, but optimum values may differ for different gum systems.

The amount of gum may be conveniently expressed on the basis of a gum to alpha cellulose ratio. In these terms, satisfactory results are achieved when the gum to alpha cellulose ratio is about 0.135:1 to 0.3:1.

Other ingredients which are beneficial but not essential include those additives or improvers normally included in bread formulations. One class of improvers which finds utility in the present invention is the lipoidal emulsifier. See, e.g., Tsen, U.S. Pat. No. 3,780,188. Representative of these compounds are the sodium salts of an acyl lactylate and polyoxyethylene derivatives of glycerol acylates. According to Tsen, when incorporating large quantities of protein sources into bread formulations, these additives are required. Tests show, however, that while these additives are useful in their normal ranges, they are not required in order to produce the product of the present invention.

Other ingredients which may be included in the bread formulation of the present invention include those normally contained in standard white bread formulations. These additives perform their normal functions in improving quality at about normal levels and, of course, are only incidentally a part of this invention.

The formulation of the present invention can be converted to a bread product by any of the well known baking procedures such as the straight dough, sponge dough, or modifications thereof.

The bread product formed by baking the above-described formulation without any coloring is essentially identical to standard white bread in appearance and texture. This bread product generally comprises from about 40 to about 45% by weight moisture, from about 9 to about 11% by weight protein, and from about 4 to about 7% by weight fiber. This represents a fiber content of about three times the amount present in standard whole wheat bread. The caloric content of this bread product is generally from about 25% to about 40% lower per unit weight than standard white bread. Preferably, the caloric content of the bread of the present invention is from about 165 to about 200 calories per 100 grams.

The following specific examples are intended to illustrate more fully the nature of the present invention without acting as a limitation on its scope.

EXAMPLE 1

This Example demonstrates a series of bread formulations according to the present invention. The proteinaceous materials used were derived from various plant and animal sources. The control for the experiment was a white bread of typical commercial formulation.

The baking process was a typical sponge-dough process using a 70% sponge. Formulas for the breads are given below. No. 1 is the control, a white bread of typical commercial formulation control; No. 2 through No. 6 differ only in the high protein material employed. Formulas are in parts by weight.

| Sponge Ingredients | Formula 1 | 2 – 6 |
|---|---|---|
| Flour (Bakers Patent) | 420 | 350 |
| Yeast Food (Arkady) | 4.5 | 3.75 |
| Lard | 18. | — |
| Gluten (Vital) | — | 35 |
| Yeast (Fresh) | 15. | 12.5 |
| Water | 252 | 260 |

| Dough Ingredients | Formula 1 | 2 – 6 |
|---|---|---|
| Flour (Bakers Patent) | 180 | 150 |
| Sucrose Corn Sugar | 30 | 10 |
| Salt | 12 | 13 |
| Non Fat Dry Milk Solids | 12 | — |
| Cellulose Flour | — | 60 |
| Protein Ingredient | — | 45 |
| Emplex (Sodium Stearoyl 2 Lactylate) | — | 3.75 |
| Methocel (Dow K-4M) | — | 5 |
| Carboxymethyl cellulose (Hercules 7HF) | — | 5 |
| Water | 138 | 275 |

The source and characteristics of the protein ingredients are listed below:

| Formula | Ingredient | Source | Approx. % Protein (N:6.25) |
|---|---|---|---|
| 2 | Heat Treated Soy Flour | Central Soya | 52% |
| 3 | Non Fat Dry Milk | Land O Lakes, Inc. | 35.2% |
| 4 | Empro-whey Protein | Stauffer Chem. Co. | 52.5% |
| 5 | Torula Yeast P-10 | Amoco Foods Co. | 52% |
| 6 | Lactalbumin (Acid) | — | — |

The sponge ingredients were mixed for three minutes at low speed on a Hobart Mixer equipped with a Mac-Duffey jacketed bowl. Sponges came out at 80° F. and were allowed to ferment for 3.5 hours at this temperature.

The dough ingredients and water to give a proper consistency were remixed with the sponge for three minutes in low speed and six minutes in second on the Hobart. The doughs, well developed by this mixing, were given a floor time of 20 minutes, were divided, given 10 minutes of overhead proof, sheeted and molded and panned. Dough pieces of 454 grams were used in pans, with a depth, width, and length of 2½ inches × 3¾ inches × 9⅛ inches.

Pan proofing at 110° F. was to ¾ inch above the pan. The loaves were baked at 435° F. for 20 minutes. After one hour the loaves were sealed in polyethylene bags and stored for 12 hours at 70° F.

The loaves were then weighed and volumes determined by rape seed displacement. They were subjectively scored taking into account such factors as color, grain texture, symmetry, volume and flavor. The scoring is subjective and relative but by this system 83–87 is normal for commercial market bread. Scores below 80 are scarcely marketable and above 90 are unusually good.

| Formula | Proof Time Min. | Volume (Av. ml) | Loaf Wt. gm. | Quality Score |
|---|---|---|---|---|
| 1 | 44 | 2100 | 397 | 85 |
| 2 | 43 | 2212 | 392 | 85 |
| 3 | 52 | 2200 | 385 | 84 |
| 4 | 51 | 2237 | 388 | 83 |
| 5 | 47 | 2112 | 393 | 80 |
| 6 | 49 | 2012 | 393 | 83 |

The white bread (Formula 1) was normal and satisfactory bread of commercial quality. Formulas 2–7 gave comparable loaf volume and bakeout losses. Formulas 2, 3, 4, and 6 provided loaves distinctive only in being slightly dark, comparable probably to bread made with unbleached flour. Formula 5 loaves were distinctly dark in color and had an undesirable grain character and texture and an unappealing flavor. Formula 6 containing lactalbumin also had a slightly "off" flavor.

It was apparent that any of these proteinaceous additives could be used, most of them alone, all in some combination to achieve an increased protein content bread. Other materials such as cotton seed, fish and meat protein could also serve.

These loaves were submitted to routine proximate analysis to verify the crude fiber and protein content. Because of the nature of the bread, the carbohydrate content, starch and soluble sugars, were determined by analysis rather than difference. Procedures used were as follows:

Ash: AOAC (12th ed., 1975), methods 14.095, 14.006; AACC 08-18, 08-01.

Fiber: AOAC (12th ed., 1975), method 7.050-7.054, modified.

Fat: AOAC (12th ed., 1975), method 14.019.

Moisture: (on prepared sample) AOAC (12th ed., 1975), method 7.003 modified; AOCS Ba 2-38.

Protein: AOAC (12th ed., 1975), method 2.049, 7.016 (factor 5.70).

Reducing Sugars: Luchsinger & Cornesky, Analytical Biochemistry vol. 4, 1962.

Starch: AOAC (12th ed., 1975), methods 31.034, 31.035, 31.036; AACC 76-10.

Sucrose: AOAC (11th ed., 1970), methods 31.0210, 31.026c; Analytical Biochemistry, vol. 4, 1962.

It should be pointed out that these analysis give a reasonable evaluation of a food but that the totals will only approach 100%. Discrepancies result from the approximation of protein through the use of a factor which actually may vary, the loss of some mineral components through volatization in the ashing process, losses of cellulose in the crude fiber determination (about 20%), the lack of routine determination methods for gums and the like.

The results of the assays were:

| Assays | Formula | | | | | |
|---|---|---|---|---|---|---|
| | 1 | 2 | 3 | 4 | 5 | 6 |
| 1. Moisture | 36.34 | 43.63 | 42.50 | 42.33 | 43.70 | 42.90 |
| 2. Ash | 1.84 | 1.95 | 2.16 | 2.13 | 1.83 | 1.82 |
| 3. Protein | 8.60 | 9.9 | 9.7 | 10.2 | 10.0 | 11.2 |
| 4. Fat | 3.94 | 1.95 | 1.09 | 1.59 | 2.24 | 1.42 |
| 5. Fiber | .25 | 4.49 | 4.32 | 4.46 | 4.54 | 4.32 |
| 6. Starch | 48.2 | 35.2 | 35.8 | 36.0 | 35.2 | 36.5 |
| 7. Reducing Sugar | 3.10 | .47 | 1.85 | .33 | .60 | .47 |
| 8. Sucrose | — | .06 | .13 | .12 | — | — |
| 9. Assimilable Carbohydrate (Sum of 6, 7, and 8) | 51.3 | 35.7 | 37.6 | 36.4 | 35.8 | 37.0 |

As expected, the fiber content and protein, in the experimental loaves were high and in the desired range. The caloric contribution of the breads to the dietary was calculated by using the Atwater procedure (Agriculture Handbook No. 8) using the following factors for purified components:

Protein: 3.90

Carbohydrate: 3.87

Fat: 8.84

The calculated caloric content per 100 grams of these breads were as follows:

| Formula | Calories/100 gms. |
|---|---|
| 1 | 266.8 |
| 2 | 194.0 |
| 3 | 192.9 |
| 4 | 194.8 |
| 5 | 197.3 |
| 6 | 199.5 |

Unexpectedly, all the "diet" type loaves had a significantly lower caloric value than either the commercial formula used or the accepted Handbook value of 275 calories/100 gms. This was greater than could be accounted for by the amount of calorie free cellulosics employed. Investigation indicated that this unexpected reduction resulted from the cellulosics and the high water binding capacities of these cellulosics with a carrying level of vital wheat gluten and the protein additives.

This caloric reduction of about 30% was recognized to be of dietary significance and unique in a product having a high fiber content and still possessing the general appearance and acceptability of standard white bread.

EXAMPLE 2

This Example demonstrates the effects of various levels of heat-treated, defatted soy flour as a high protein ingredient. The procedures for making bread and the formulas were the same as in Example 1 except that the protein ingredient, soy flour, used in the sponge was varied as follows. Water was adjusted also to prepare a physically satisfactory dough.

| Formula | Soy Flour | Water |
|---|---|---|
| 1 | (Control) | |
| 2 | 0 gms (0%) | 230 ml |
| 3 | 25 gms (5%) | 255 ml |
| 4 | 45 gms (9%) | 275 ml |
| 5 | 50 gms (10%) | 280 ml |
| 6 | 60 gms (12%) | 290 ml |

The data obtained in these tests and through examination of the products was as follows:

| Formula | Proof Time Min. | Volume (Av. ml) | Loaf Wt. gm. | Quality Score |
|---|---|---|---|---|
| 1 | 40 | 2063 | 391 | 85 |
| 2 | 42 | 2175 | 387 | 80 |
| 3 | 47 | 2200 | 386 | 81 |
| 4 | 49 | 2250 | 384 | 85 |
| 5 | 48 | 2212 | 390 | 85 |
| 6 | 48 | 2163 | 389 | 82 |

The loaves were submitted to total proximate analysis as in Example 1 with the following results:

| | | | Formula | | | |
|---|---|---|---|---|---|---|
| Assays | 1 | 2 | 3 | 4 | 5 | 6 |
| 1. Moisture | 35.6 | 41.9 | 42.1 | 42.0 | 42.2 | 42.3 |
| 2. Ash | 2.05 | 1.99 | 2.10 | 2.13 | 2.09 | 2.10 |
| 3. Protein | 8.54 | 9.05 | 9.66 | 10.2 | 10.3 | 10.6 |
| 4. Fat | 3.61 | 1.68 | 1.82 | 1.87 | 1.89 | 1.96 |
| 5. Fiber | .33 | 4.87 | 4.68 | 4.72 | 4.63 | 4.62 |
| 6. Starch | 49.9 | 41.5 | 36.4 | 35.4 | 35.4 | 35.2 |
| 7. Reducing Sugar | 3.24 | .46 | .47 | .59 | .65 | .65 |
| 8. Sucrose | .05 | .06 | .06 | .13 | .20 | .13 |
| 9. Assimilable Carbohydrate (Sum of 6, 7, and 8) | 53.1 | 42.0 | 36.9 | 36.1 | 36.2 | 36.0 |

The caloric values calculated from these data were as follows:

| Formula | Calories/100 gms. |
|---|---|
| 1 | 270.8 |
| 2 | 212.7 |
| 3 | 196.7 |
| 4 | 196.3 |
| 5 | 196.9 |
| 6 | 197.8 |

It is quite apparent from this data that some proteinaceous ingredient is required to get market quality bread and that an excess is deleterious. The optimum range would probably be somewhat variable but the indications are that a range of 7-11% (Bakers percentage) is most satisfactory. The proteinaceous material obviously has technological functions other than providing nutrition. This is unusual in white bread where normally such additions have a diluting effect on the functional wheat protein.

The caloric calculations and especially those for formulas 2 and 3 indicate that a small quantity (5%) causes a caloric reduction of about 8% of that of standard white bread. The calculations indicate that further additions have no further significant effect on the caloric content.

EXAMPLE 3

This Example demonstrates the range of levels of Vital Gum Gluten required in the practice of this invention. The methods employed were those of Example 1. The amount of gum gluten was varied in the sponges and water was adjusted to bring them together properly. Formula 1 was the white bread control. The test sponges varied as follows:

| Formula | Gum Gluten (gms.) | Water (ml) |
|---|---|---|
| 2 | 0 (0%) | 210 |
| 3 | 10 (2%) | 224 |
| 4 | 25 (5%) | 246 |
| 5 | 35 (7%) | 260 |
| 6 | 50 (10%) | 282 |

The sponges were fermented and the doughs prepared and baked with the following results:

| Formula | Proof Time | Volume ml | Loaf wt. gms. | Quality Score |
|---|---|---|---|---|
| 1 | 42 | 2062 | 396 | 85 |
| 2 | 40 | 2000 | 396 | 79 |
| 3 | 44 | 2100 | 388 | 81 |
| 4 | 39 | 2175 | 390 | 83 |
| 5 | 39 | 2175 | 392 | 85 |
| 6 | 40 | 2125 | 389 | 81 |

Formula 2 gave a loaf noticeably pale in color and open in grain. Formula 6 bread was judged to be excessively tough. The remainder were good and acceptable in quality.

As in Example 1 these loaves were submitted to analysis with the following results and these results were used to calculate the calories per 100 grams using the method described.

| | | | Formula | | | |
|---|---|---|---|---|---|---|
| Assays | 1 | 2 | 3 | 4 | 5 | 6 |
| 1. Moisture | 36.3 | 42.6 | 42.5 | 42.7 | 43.5 | 43.2 |
| 2. Ash | 2.5 | 2.13 | 2.12 | 2.09 | 2.03 | 1.97 |
| 3. Protein | 8.60 | 8.44 | 9.09 | 9.86 | 10.3 | 11.1 |
| 4. Fat | 3.48 | 2.10 | 2.04 | 2.02 | 1.86 | 1.84 |
| 5. Fiber | .42 | 4.88 | 4.77 | 4.70 | 4.59 | 4.53 |
| 6. Starch | 49.0 | 34.4 | 32.4 | 33.1 | 34.2 | 33.1 |
| 7. Reducing Sugar | 3.11 | 1.09 | .99 | 1.06 | .97 | .89 |
| 8. Sucrose | | | Less than .05 | | | |
| 9. Assimilable Carbohydrate (Sum of 6, 7, and 8) | 52.1 | 35.5 | 32.5 | 34.1 | 35.2 | 34.0 |

| Formula | Calories/100 gms. |
|---|---|
| 1 (Control) | 265.9 |
| 2 | 188.8 |
| 3 | 179.3 |
| 4 | 188.4 |
| 5 | 192.8 |
| 6 | 191.2 |

From these results, it is apparent that some vital gum gluten is necessary for this bread-like product and that satisfactory results can be obtained most reliably when the level is between 3% and 9% based on the flour in the total formula being 100%. The data indicates that the function of the gluten in this invention is one of carrying the cellulose and other ingredients and that the gluten does not directly reduce the caloric content of the product itself.

EXAMPLE 4

A series of test bakes were made using the methods of Example 1. The white bread formula was used as the control. The cellulose flour was #BH200, a bleached hardwood alpha cellulose produced by International Filler Co. This product has a particle size such that about 90% will pass a standard 200 mesh screen. The dough formulation was otherwise like that of Formula 2, Example 1.

| Formula No. | Alpha Cellulose (gms.) | | Dough water (ml) |
|---|---|---|---|
| 2 | 9% | 45 | 250 |
| 3 | 12% | 60 | 275 |
| 4 | 15% | 75 | 305 |
| 5 | 17% | 85 | 325 |
| 6 | 20% | 100 | 355 |

These loaves were evaluated and scored as previously indicated with the results tabulated below:

| Formula | Proof Time | Volume (ml) | Loaf wt. (gms) | Quality Score |
|---|---|---|---|---|
| 1 | 45 | 2150 | 390 | 85 |
| 2 | 45 | 2262 | 389 | 84 |
| 3 | 45 | 2262 | 387 | 85 |
| 4 | 47 | 2300 | 391 | 85 |
| 5 | 50 | 2362 | 382 | 85 |
| 6 | 48 | 2375 | 384 | 83 |

These were submitted to proximate total analysis as described in Example 1 with the following data being obtained:

| | | | Formula* | | |
|---|---|---|---|---|---|
| Assays | 2 | 3 | 4 | 5 | 6 |
| 1. Moisture | 40.3 | 40.6 | 42.2 | 40.3 | 43.0 |
| 2. Ash | 2.21 | 2.10 | 2.02 | 2.03 | 1.89 |
| 3. Protein | 10.7 | 10.3 | 9.94 | 10.1 | 9.58 |
| 4. Fat | 2.07 | 2.04 | 1.89 | 1.74 | 1.80 |
| 5. Fiber | 3.83 | 4.72 | 5.57 | 6.23 | 6.95 |
| 6. Starch | 38.3 | 36.8 | 36.0 | 36.0 | 35.1 |
| 7. Reducing Sugar | .63 | .59 | .51 | .53 | .51 |
| 8. Sucrose | .40 | .07 | .25 | .13 | .31 |
| 9. Assimilable Carbohydrate (Sum of 6, 7, and 8) | 39.3 | 37.5 | 36.8 | 36.6 | 35.9 |

*Formula 1 - Control not assayed

All the breads were satisfactory in quality and flavor. With the highest level of cellulose (20%) the dough was somewhat slack and the loaf slightly more open than ideal. Formula 2 did not possess as much crude fiber as desired. As the level of cellulose was increased from 9% to 20% (Bakers percentage) there was an increase in the measured crude fiber from 3.83 to 6.95. Adjustments in water necessitated by the cellulose had no net effect on the ultimate moisture content of the bread but did have a general diluting effect on other constituents as measured. This diluting effect did decrease the caloric content of the breads as calculated.

| Formula | Calories/100 gms. | % Reduction |
|---|---|---|
| 2 | 212.1 | 23% |
| 3 | 203.3 | 26% |
| 4 | 197.9 | 28% |
| 5 | 196.8 | 28% |
| 6 | 189.1 | 31% |

The results obtained in this test demonstrate that the level of alpha cellulose which yields a bread comparable to white bread is in the range of 10%–20% baker's percentage. It is to be noted that approximately doubling the alpha cellulose had no comparable effect on caloric reduction.

EXAMPLE 5

For the purposes of this Example, two synthetic gums and four natural gums were selected and these employed at a 15% level based on the alpha cellulose in the product formula. Although they form gels of widely varying strengths in ambient temperature water no absorption alterations were required. The sponge formulas in this Example were the same as in Formulas 2–6 of Example 1. The dough ingredients differed, however, as follows:

| Dough Ingredients | Gms |
|---|---|
| Flour (Bakers Patent) | 150 |
| Sucrose | 10 |
| Salt | 15 |
| Non Fat Dry Milk Solids | 15 |
| Cellulose Flour (International) | 70 |
| Soy Flour | 45 |
| Emplex (sodium stearoyl - 2 - lactylate) | 3.75 |
| Gum (type variable) | 10.5 |
| Calcium Propionate | 1.5 |
| Water | 310 |

The gums employed were as follows in the formulas of this series:

| Formula | Gum | Trade Name or Grades | Source |
|---|---|---|---|
| 1 | No gum Control | — | — |
| 2 | Sodium Carboxymethylcellulose | CMC 7HF | Hercules Inc. |
| 3 | Hydroxypropylmethylcellulose | K 4M | Dow Chemical Co. |
| 4 | Guar | Jaguar J2S-1 | Stein Hall & Co., Inc. |
| 5 | Tragacanth | Dandy Brand | Myers & Hicks Co. |
| 6 | Karaya | Dandy Brand | Myers & Hicks Co. |
| 7 | Algin | Kelset | Kelco Co. |
| 8 | Carrageenan | Gelcarin DG | Marine Colloids, Inc. |

The bake tests were made and the products were examined as in Example 1 with the following results:

| Formula | Proof Time Min. | Volume (Av. ml) | Loaf Wt. gms. | Quality Score |
|---|---|---|---|---|
| 1 | 58 | 1950 | 386 | 80 |
| 2 | 56 | 2137 | 390 | 85 |
| 3 | 56 | 2100 | 393 | 85 |
| 4 | 51 | 2087 | 390 | 84 |
| 5 | 51 | 2000 | 387 | 83 |
| 6 | 56 | 1850 | 392 | 80 |
| 7 | 51 | 1850 | 385 | 79 |
| 8 | 51 | 1650 | 394 | 78 |

These results indicate that the satisfactory gums have a true function in this low calorie bread invention. What is satisfactory, however, must be established experimentally. The synthetic gums, being relatively undigested by enzymes were fully functional. The natural gums, Guar and Tragacanth, were also functional. Karaya, Algin, and Carrageenan were either without function or deleterious depending upon the effect of the enzymes in the baking process and the by-products produced from them.

EXAMPLE 6

To illustrate the general functionality of alpha cellulose, three alpha cellulose flours were subjected to bake tests using the formulas and procedures described in Example 5. The cellulose flours were:

| Formula | Product | Manufacturers | |
|---|---|---|---|
| 1 | BH 200 | International Filler Corp. | Tonowanda, N.Y. |

| Formula | Product | Manufacturers | |
|---|---|---|---|
| 2 | Avicel PH-101 | FMC Corporation | Marcus Hook, Pa. |
| 3 | Solka Floc BN-200 | Brown Co. | Berlin, N.H. |

The results of these bake tests were as follows:

| Formula | Proof Time Min. | Volume (ml) | Loaf Wt. gms. | Quality Score |
|---|---|---|---|---|
| 1 | 59 | 2250 | 387 | 85 |
| 2 | 60 | 2200 | 389 | 84 |
| 3 | 58 | 2267 | 393 | 85 |

It will be apparent that with these products substantially no differences in functionality were observed. It may fairly be assumed that any alpha cellulose product having generally the physical and chemical properties of these will behave in similar function with but minor changes in absorption and dough mixing time required for compensation in any differences.

EXAMPLE 7

This Example demonstrates the range of ratios for functional gums to alpha cellulose in the low calorie bread product formulas of the present invention. The procedures were the same as in Example 5 but the gum, sodium carboxymethyl cellulose, was varied as follows:

| Formula | Gms of CMC |
|---|---|
| 1 | 0 |
| 2 | 2.5 |
| 3 | 5 |
| 4 | 10 |
| 5 | 15 |
| 6 | 20 |
| 7 | 25 |
| 8 | 30 |

The bread product obtained was evaluated as follows:

| Formula | Proof Time Min. | Volume (Av. ml) | Loaf Wt. gms. | Quality Score |
|---|---|---|---|---|
| 1 | 60 | 1987 | 390 | 80 |
| 2 | 52 | 2175 | 390 | 84 |
| 3 | 53 | 2150 | 391 | 84 |
| 4 | 59 | 2137 | 385 | 85 |
| 5 | 52 | 2262 | 385 | 85 |
| 6 | 51 | 2212 | 387 | 85 |
| 7 | 56 | 2142 | 392 | 84 |
| 8 | 59 | 2120 | 391 | 84 |

These results demonstrate again the functionality of a satisfactory gum and further that this functionality extends from .5 to 6 parts per 100 parts by weight of flour in the formula. Expressed in another way, the ratio of gum to alpha cellulose was found to be functional from .135 to at least .3 to 1.

There was, however, a maximum functionality of somewhere in the range of 1 to 4 parts per 100 of flour for this particular brand and grade of carboxymethyl cellulose. Other brands and gum types have other ranges which is the basis of preference for mixtures of two or even more gums in the formulas. It might be noted that in spite of the known ability of the gum to form a high viscosity mass with large amounts of water, no changes in dough water requirements were noted or made.

EXAMPLE 8

This Example demonstrates that lipoidal additives are useful but not necessary to produce the low calorie white type bread product of this invention. Accordingly, breads were made using the formulas and procedures as in Example 1. Formula 1 was the white bread control. Formulas 2-7 used 9% soy flour (Bakers %) as in Formula 2 of Example 1. Various lipoidal additives were used at 0.75% (3.75 gms.) as follows:

| Formula | Additive | Brand Name | Source |
|---|---|---|---|
| 1 | White bread control | — | — |
| 2 | None | — | — |
| 3 | Sodium Stearoyl 2 Lactylate | Emplex | C. J. Patterson Co. |
| 4 | Glyceryl Monostearate | Repco 90 | Research Products Co. |
| 5 | Ethoxylated Monoglycerides | EMG 20 | Breddo Food Product |
| 6 | Polysorbate 60 | Repco P60 | Research Products Co. |
| 7 | Prime Lard | — | Swift & Co. |
| 8 | Calcium Stearoyl 2 Lactylate | Verv | C. J. Patterson Co. |

The test loaves were examined as in Example 1 with the following results:

| Formula | Proof Time Min. | Volume (Av. ml) | Loaf Wt. gms. | Quality Score |
|---|---|---|---|---|
| 1 | 43 | 2137 | 392 | 85 |
| 2 | 47 | 2100 | 390 | 82 |
| 3 | 47 | 2175 | 385 | 85 |
| 4 | 45 | 2168 | 390 | 84 |
| 5 | 46 | 2212 | 396 | 85 |
| 6 | 50 | 2312 | 385 | 85 |
| 7 | 45 | 2187 | 391 | 83 |
| 8 | 50 | 2200 | 386 | 85 |

While all the additives including lard had some salutory effect on bread quality and loaf volume, and were deemed desirable in the procedure of this invention, it was apparent that none were of absolute necessity.

Analyses and caloric evaluations are not provided because they are virtually identical to Formula 2 of Example 1.

EXAMPLE 9

To further explore the function of lipoidal emulsifiers a further series of bake tests were made in the manner of Example 8. The Formulas were the same, but the levels of the sodium stearoyl 2 lactylate were varied as follows:

| Formula | Variable |
|---|---|
| 1 | White bread control |
| 2 | 0% Emplex (Bakers %) |
| 3 | 1κ% Emplex |
| 4 | ¾% Emplex |
| 5 | 1% Emplex |

The results upon examination of the data are summarized below:

| Formula | Proof Time Min. | Volume (Av. ml) | Loaf Wt. gms. | Quality Score |
|---|---|---|---|---|
| 1 | 44 | 2125 | .392 | 85 |
| 2 | 47 | 2212 | 385 | 82 |
| 3 | 50 | 2312 | 379 | 84 |
| 4 | 44 | 2300 | 386 | 85 |
| 5 | 48 | 2237 | 384 | 85 |

These data indicate that the low calorie bread-like product of this invention is approximately as acceptable as white bread as reflected by the quality score. Generally for the same loaf weights, better volumes were obtained. The sodium stearoyl 2 lactylate performed its function in the usual usage range (0.5 to 1.00%) and such usage, while not mandatory, is beneficial in the practice of the instant invention.

EXAMPLE 10

Based on the teachings of small scale laboratory tests of the type described in prior Examples, a formula was devised and optimized for use in a highly mechanized commercial bakery. This formula is presented below in the traditional Bakers Percentage which is based on 100 parts by weights of the total flour in the formula.

| SPONGE FORMULA | |
|---|---|
| Patent Flour (Enriched) | 70% |
| Yeast Food (Arkady) | 75% |
| Gum Gluten (W. R. Short Co.) | 8% |
| Yeast Compressed | 3% |
| Water | 54% |
| DOUGH FORMULA | |
| Patent Flour (Enriched) | 30% |
| Glucose | 3% |
| Salt | 3% |
| Non Fat Dry Milk | 2% |
| Cellulose (International Filler Co.) | 18% |
| Soy Flour | 10% |
| Emplex | .75% |
| Methocel | 1.35% |
| CMC | 1.35% |
| Calcium propionate (Guard) | .34% |
| L-Lysine hydrochloride | .30% |
| Water | 76% |

Effort was made to keep the crude fiber about three times that of whole wheat bread; to maximize the caloric reduction compared to that of standard white bread by controlling the types of ingredients found to contribute to this overall reduction; and to increase the nutritional aspects of the product by known means and yet retain the general characteristics and acceptability of white bread.

The crude fiber was retained at about a 5–6% level in the product by increasing the level, (Bakers percentage) to 18%. This is not an arbitrary figure but was selected because medical experts have stated that the American diet would be vastly improved by the inclusion of 1 oz. of bran with 9.1% crude fiber or 2.6 grams of crude fiber per day. It was calculated that 2 oz. of this bread product with about 5% crude fiber would supply this adequately.

The caloric reduction was accomplished by the combined near optimum levels of alpha cellulose, gum gluten, high protein soy flour and dry milk, and indigestible gums in the manner of this invention.

To improve the nutritional qualities, enriched flour was employed so that the product would approach the levels of B vitamins and iron found in whole wheat bread. Lysine, as hydrochloride, was introduced so that the bread would become not only a significant source of protein in quantity but also in quality. It is well known that the protein efficiency ratio of wheat protein is materially improved by adding the amino acid, lysine, in which it is most deficient.

The formula as given was first developed on a laboratory scale. It consistently provided 84–86 score bread by the procedure outlined in Example 1. This product gave the following proximate total analysis.

| LABORATORY PROCESS | | |
|---|---|---|
| Moisture | | 42.1 |
| Ash | | 2.18 |
| Protein | | 10.8 |
| Fat | | 1.74 |
| Fiber | | 6.07 |
| Starch | | 30.8 |
| Reducing Sugar | | 1.06 |
| Sucrose | less than | 0.05 |
| Assimilable Carbohydrate | | 31.9 |
| Cal./100 gms. calculated | | 181 (Reduction of 34%) |

The same formula was used in a medium sized wholesale bakery. Certain alterations in the sponge and dough procedure were necessary to fit the scheduling. The formula as used was based on 500 lbs. of total flour. Sponge mixing and fermentation conditions were normal. The dough was, however, mixed at high speed for 11 minutes, three minutes after "pick-up." After 20 minutes floor time, the dough was divided to provide dough pieces scaled at 18.3–18.5 ounces. The dough pieces were given only five minutes of overhead proof.

The dough pieces were placed in 3 inches × 4½ inches × 9 inches strapped pans and after proofing one hour (about ½ inch above the edge of the pan) were baked at 450° for 18 minutes in a travelling oven.

The loaves were cooled for one hour and sliced. They weighed one pound approximately and were judged to be 86–87 score bread using a judging procedure for white bread; they were good commercial quality. One loaf taken at random was subjected to analysis.

| COMMERCIAL PROCESS | | |
|---|---|---|
| Moisture | | 45.6 |
| Ash | | 2.19 |
| Protein | | 9.8 |
| Fat | | 1.63 |
| Fiber | | 5.55 |
| Starch | | 28.4 |
| Reducing Sugar | | 0.87 |
| Sucrose | less than | 0.05 |
| Assimilable Carbohydrate | | 29.3 |
| Cal./100 gms. calculated | | 166 (Reduction of 40%) |

There was little difference in the breads as far as quality was concerned but the commercial process provided a product with a slightly lower caloric value due to a higher moisture content. This was caused by the larger loaf with a lower surface to mass ratio and probably somewhat to the shorter baking time.

This Example demonstrates the fact that the small scale baking tests do simulate the results in a large bakery as is intended.

EXAMPLE 11

Commercial baking operations use several procedures in bread making which differ rather widely in detail although by proper adjustments a formula can be adapted to any of them.

The most widely used process is the sponge and dough procedure used in the previous Examples. The straight dough procedure is commonly used in small shops and differs in that all the ingredients are mixed together and given a somewhat shorter fermentation time. Variants of the straight dough referred to as brew processes, remix straight dough processes, continuous mixes, are well known. "No time" doughs are the most radical variant in that the fermentation time is very short and the effects of long fermentation are accomplished by physical and chemical means; see Thompson, U.S. Pat. No. 3,777,038. The formula in Example 10 was altered to permit use of a "no time" process to demonstrate the adaptability of this invention to bread making processes in general. The Example 10 formula was altered by eliminating the conventional yeast food, the sponge and dough ingredients were combined, the amount of compressed yeast was increased to 4.5% and to them were added the following:

| Ingredient | Bakers percentage |
| --- | --- |
| Calcium Sulfate | .125 |
| Fumaric Acid | .0115 |
| Ammonium Chloride | .0485 |
| Ascorbic Acid | .0075 |
| Potassium Bromate | .0030 |

The dry ingredients were placed in the mixer with the yeast and water. The dough was mixed to proper consistency and removed from the mixer at 85° ± 20°. It was placed in a trough and given a floor time of 40 minutes and was then divided and rounded. After 15 minutes of overtime proof the dough pieces were sheeted, moulded, panned and proofed and baked as in Example 1.

The loaves obtained had the following characteristics as measured and observed:

| | |
| --- | --- |
| Loaf weight (average) | 396 |
| Loaf volume (average) | 2025 |
| Loaf score - subjective | 83-84 |

The results obtained indicate that any conventional baking process, of which this "no time" straight dough process is the most radical variant, with suitable physical alteration can be made to yield a quality bread-like product by the formula of this invention.

EXAMPLE 12

The experience derived in devising a well balanced low calorie bread product as in Example 10 suggested that by adjustment of the levels of gums, protein agents, gluten and cellulose that it might be possible to increase the cellulose somewhat with a resultant reduction in calories without a decline in quality.

Accordingly, in the laboratory and using the procedures of Example 1 breads were made with elevated levels of alpha cellulose flour. The sponges were as described in that example. Three doughs were formulated as below and processed as before.

| Ingredient | |
| --- | --- |
| Patent Flour | 30% |
| Glucose | 2% |
| Salt | 3.0 |
| Nonfat dry milk | 6.0 |

| Ingredient | |
| --- | --- |
| *-continued* | |
| Cellulose (International Filler) | Variable 18, 20, 22% |
| Soy Flour | 8.5 |
| Emplex | .5 |
| Methocel | 1.1 |
| CMC | 1.1 |
| Calcium proprionate | .34 |
| Water | Variable 73, 74, 75% |

The baked loaves were scored and analyzed and the significant figures are tabulated below.

| Dough | Cellulose Flour | Quality | Crude Fiber | Moisture | Cal./ 100 gm | Reduction |
| --- | --- | --- | --- | --- | --- | --- |
| #1 | 18% | 85 | 5.82 | 45.0 | 173 | 37% |
| #2 | 20% | 85 | 6.13 | 44.3 | 172 | 37% |
| #3 | 22% | 83 | 6.71 | 45.2 | 167 | 39% |

The products were all of salable quality but #3 was somewhat short on volume and slightly dough-like internally. There was the expected increase in fiber but only a slight reduction in calories. It was quite apparent that the upper limit of cellulose flour usage is about 20% as indicated in Example 4, and that the probable limit in caloric reduction is about 40%.

EXAMPLE 13

There are many bread consumers having a preference for darker crumb colors, harsher and stronger flavors than the bread-like products which have heretofore been described.

Methods of making such varieties starting with a basic formulation are well known to bakers. They consist essentially of introducing relatively coarse wheat products such as cracked wheat, rolled wheat, whole wheat flour, bran and the like or similar ingredients derived from oats, sesame, flaxseed and other food seed products. Flavors and colors are altered commonly by the use of caramel and various spices, extracts and sours in relatively small amounts as required.

The variations possible are extremely wide but the following formulation serves to illustrate the mode by which a highly acceptable dark variety can be made by the process of this invention.

The high gluten sponge was the same as that presented in Example 10. The dough formula was, however, varied as follows so that a proper balance between total water and starchy ingredients was maintained.

| DOUGH FORMULA | |
| --- | --- |
| Patent Flour | 30% |
| Sucrose | 4% |
| Salt | 3.2% |
| Nonfat dry milk | 2% |
| Cellulose (International Filler Co.) | 20% |
| Soy Flour | 7% |
| Emplex | .4% |
| Methocel | 1.0% |
| CMC | 1.0% |
| Calcium propionate | .35% |
| Caramel (Sethness Products Co.) | .60% |
| Turmeric Extract (Kalsec) | .01% |
| Rolled Wheat (Pillsbury Co.) | 4.2% |
| Water | 75% |

The formula was used in the sponge and dough process and on a commercial scale as in Example 10.

The product was an attractive loaf, bold and well formed and closely resembling that normally sold as wheat bread. The crumb color was a pale coffee color, the texture was noticeably but not objectionably roughened by the bits of rolled wheat, and it was slightly more open than lighter varieties. The extra sugar and the caramel and spice oil made for the slightly sweeter and stronger flavor associated with a wheat bread. It was judged to be of excellent quality both in appearance and flavor.

This dark loaf was subjected to total proximate analysis with the following results.

| DARK LOW CALORIE VARIETY | | |
| --- | --- | --- |
| Moisture | 42.5% | |
| Ash | 2.08% | |
| Protein | 9.12% | |
| Fat | 1.80% | |
| Fiber | 7.15% | |
| Starch | 28.26% | |
| Reducing Sugar | 2.35 | |
| Sucrose | trace | |
| Assimilable Carbohydrate | 30.61 | |
| Cal/100 gms. calculated | 170 | (Reduction of 38%) |

Other dark varieties have been made following the principles described using cracked wheat, bran, rolled oats and even a toasted flaked soy bean. The levels of the coarsening agents needed is usually between 4–12% (Bakers percentage) and because of their water carrying content and native crude fiber, some adjustment in cellulose flour and gums downward is usual. The amount of coloring and flavoring agents is variable but usually quite small because of their potency.

The toasted soy bean yielded an excellent loaf with a slight roasted peanut flavor and a chocolate chip appearance. It was considered too radical a departure for the present market, but clearly demonstrated the feasibility of creating entirely new low calorie varieties within the framework of this invention. Practically, this invention can be utilized in a vast array of bread-like products differing in appearance and flavor.

While certain specific embodiments of the invention have been described with particularity herein, it should be recognized that various modifications thereof will occur to those skilled in the art. Therefore, the scope of the invention is to be limited solely by the scope of the claims appended hereto.

I claim:

1. A dough composition for making a bread product, said dough composition comprising wheat flour, water, salt, yeast, fermentable sugar, said dough composition containing from about 3 to about 9 parts by weight of an added vital wheat gluten, from about 5 to about 12 parts by weight of a protein material selected from the group consisting of lowfat soy flour, nonfat dry milk, dried yeast flour, cottonseed flour, and mixtures thereof, from about 10 to about 20 parts by weight of an alpha cellulose flour, and from about 0.5 to about 6 parts by weight of a hydrophilic gum selected from the group consisting of synthetic cellulose ethers, gum guar and gum tragacanth and mixtures thereof, all of said ingredients being expressed as parts by weight per 100 parts of wheat flour.

2. The composition of claim 1 wherein said added vital wheat gluten is present in an amount of from about 6 to about 8 parts by weight per 100 parts of wheat flour.

3. The composition of claim 1 wherein said protein material is lowfat soy flour.

4. The composition of claim 1 wherein said protein material is a mixture of lowfat soy flour and nonfat dry milk.

5. The composition of claim 1 wherein said alpha cellulose flour is present in an amount of from about 18 to about 20 parts by weight per 100 parts of wheat flour.

6. The composition of claim 1 wherein said synthetic cellulose ether is sodium carboxymethyl cellulose and said gum is present in an amount of from about 1 to about 4 parts by weight per 100 parts of wheat flour.

7. The composition of claim 1 additionally comprising from about 4 to about 12 parts by weight of a coarsening agent.

8. The composition of claim 7 wherein said coarsening agent is bran.

9. A dough composition for making a bread product, said dough composition comprising wheat flour, water, salt, yeast, fermentable sugar, said dough composition containing from about 6 to about 8 parts by weight of an added vital wheat gluten, from about 5 to about 12 parts by weight of a protein material selected from the group consisting of lowfat soy flour, nonfat dry milk, and mixtures thereof, about 18 to about 20 parts by weight of an alpha cellulose flour, and from about 1 to about 4 parts by weight of a hydrophilic gum selected from the group consisting of synthetic cellulose ethers, gum guar and gum tragacanth and mixtures thereof, all of said ingredients being expressed as parts by weight per 100 parts of wheat flour.

10. The bread-like product formed by processing and baking the dough composition of claim 1.

11. The bread-like product formed by processing and baking the dough composition of claim 8.

12. The bread-like product formed by processing and baking the dough composition of claim 9.

* * * * *